United States Patent
Tsirkin

(10) Patent No.: US 11,016,793 B2
(45) Date of Patent: May 25, 2021

(54) FILTERING BASED CONTAINERIZED VIRTUAL MACHINE NETWORKING

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/199,797

(22) Filed: Nov. 26, 2018

(65) Prior Publication Data
US 2020/0167175 A1 May 28, 2020

(51) Int. Cl.
*G06F 9/455* (2018.01)
*H04L 29/12* (2006.01)
*H04L 29/06* (2006.01)
*H04L 12/46* (2006.01)

(52) U.S. Cl.
CPC ...... *G06F 9/45558* (2013.01); *H04L 12/4641* (2013.01); *H04L 61/2015* (2013.01); *H04L 63/0236* (2013.01); *G06F 2009/45587* (2013.01); *G06F 2009/45595* (2013.01)

(58) Field of Classification Search
CPC ............ H04L 12/4641; H04L 61/2015; H04L 63/0236; G06F 2009/45587; G06F 2009/45595; G06F 9/45558
See application file for complete search history.

(56) References Cited

U.S. PATENT DOCUMENTS

| 8,776,059 | B2 * | 7/2014 | Reumann | H04L 63/0263 |
| | | | | 709/250 |
| 9,875,128 | B2 * | 1/2018 | Tsirkin | G06F 9/45558 |
| 10,079,797 | B2 * | 9/2018 | Uriel | H04L 61/103 |
| 10,320,624 | B1 * | 6/2019 | Roth | H04L 63/101 |
| 10,757,076 | B2 * | 8/2020 | Khare | H04L 63/0236 |

(Continued)

FOREIGN PATENT DOCUMENTS

WO 2017158407 9/2017

OTHER PUBLICATIONS 18.14. Applying Network Filtering; Red Hat, Inc.; https://access.redhat.com/documentation/en-us/red_hat_enterprise_linux/7/html/virtualization_deployment_and_administration_guide/sect-virtual_networking-applying_network_filtering; retrieved Jul. 27, 2018 (29 pages).

(Continued)

*Primary Examiner* — William G Trost, IV
*Assistant Examiner* — Abdelbasst Talioua
(74) *Attorney, Agent, or Firm* — K&L Gates

(57) ABSTRACT

Filtering based containerized virtual machine networking is disclosed. For example, a host has a processor, a memory, and a network interface (NIC), and a hypervisor executes on the host. A container with a filtering module executes on the host with a virtual machine (VM) with a virtual network interface (VNIC) executing on the container. The VNIC receives a message for transmission over a network. The filtering module determines whether an internet protocol (IP) address in the message matches a validation IP address configured in the filtering module. In response to determining that the IP address in the message is invalid, transmission of the message is canceled and the message is sent to a remediation service. In response to determining that the IP address in the message valid, the container forwards the message to the hypervisor, which transmits the message to the network using the IP address via the NIC.

20 Claims, 4 Drawing Sheets

(56) References Cited

U.S. PATENT DOCUMENTS

| | | | |
|---|---|---|---|
| 2007/0064697 A1* | 3/2007 | Nesbitt | H04L 63/1408 370/392 |
| 2008/0115127 A1* | 5/2008 | Hatano | G06F 9/45558 718/1 |
| 2015/0067674 A1* | 3/2015 | Melander | H04L 45/66 718/1 |
| 2015/0281274 A1* | 10/2015 | Masurekar | H04L 63/1466 726/22 |
| 2015/0370586 A1* | 12/2015 | Cooper | G06F 9/45533 710/308 |
| 2016/0212012 A1 | 7/2016 | Young et al. | |
| 2016/0216983 A1* | 7/2016 | Tsirkin | G06F 9/45558 |
| 2017/0063680 A1* | 3/2017 | Deng | H04L 61/103 |
| 2017/0170990 A1* | 6/2017 | Gaddehosur | H04L 67/1031 |
| 2017/0180249 A1* | 6/2017 | Shen | G06F 9/45558 |
| 2017/0180250 A1* | 6/2017 | Shen | H04L 45/74 |
| 2017/0223117 A1* | 8/2017 | Messerli | H04L 12/4641 |
| 2017/0310738 A1* | 10/2017 | Bansal | H04L 63/1425 |
| 2017/0317972 A1* | 11/2017 | Bansal | H04L 61/2507 |
| 2017/0353433 A1* | 12/2017 | Antony | H04L 63/0263 |
| 2018/0062983 A1 | 3/2018 | Thakkar et al. | |
| 2018/0123954 A1 | 5/2018 | Jiang et al. | |
| 2018/0262459 A1* | 9/2018 | Wang | H04L 61/103 |
| 2018/0278532 A1* | 9/2018 | Ashner | H04L 47/283 |
| 2019/0007364 A1* | 1/2019 | Wang | H04L 61/6022 |
| 2019/0087244 A1* | 3/2019 | Turner | G06F 11/1438 |
| 2019/0158497 A1* | 5/2019 | Diaz Cuellar | H04L 63/083 |
| 2019/0222559 A1* | 7/2019 | Wang | G06F 9/54 |
| 2019/0245949 A1* | 8/2019 | Wang | H04L 69/22 |
| 2019/0273683 A1* | 9/2019 | Jiang | H04L 12/4641 |
| 2020/0351333 A1* | 11/2020 | Gill | G06F 9/45558 |

OTHER PUBLICATIONS

Franco Callegati, et. al., Performance of Multi-tenant Virtual Networks in OpenStack-based Cloud, Dec. 2012, (5 pages), University of Bologna, Cesena, Italy.

\* cited by examiner

FILTERING BASED CONTAINERIZED VIRTUAL MACHINE NETWORKING

BACKGROUND

The present disclosure generally relates to virtualized computer systems. For scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity of a type that the guest is designed to provide, while isolating compute resources used by different users and tenants away from those of other users. Guests enable a programmer to quickly scale the deployment of applications to the volume of traffic requesting the applications, and they may be deployed in a variety of hardware environments. Multiple guests may also be clustered together to perform more complex functions than the respective guests are capable of performing individually. To interact with a broader set of users and a broader computing ecosystem, guests typically employ virtualized devices such as input/output ("I/O") devices controlled by drivers, including virtualized network interfaces.

SUMMARY

The present disclosure provides a new and innovative system, methods and apparatus for filtering based containerized virtual machine networking. In an example, a host has a processor, a memory, and a network interface (NIC), and a hypervisor executes on the host. A container with a filtering module executes on the host with a virtual machine (VM) with a first virtual network interface (VNIC) executing on the container. The first VNIC receives a first message for transmission over a network. The filtering module determines whether an internet protocol (IP) address in the first message matches a validation IP address configured in the filtering module. In response to determining that the IP address in the first message is invalid, transmission of the first message is canceled and the first message is sent to a remediation service. In response to determining that the IP address in the first message valid, the container forwards the message to the hypervisor, which transmits the first message to the network using the IP address via the NIC.

Additional features and advantages of the disclosed method and apparatus are described in, and will be apparent from, the following Detailed Description and the Figures.

DETAILED DESCRIPTION OF EXAMPLE EMBODIMENTS

Figure 1:
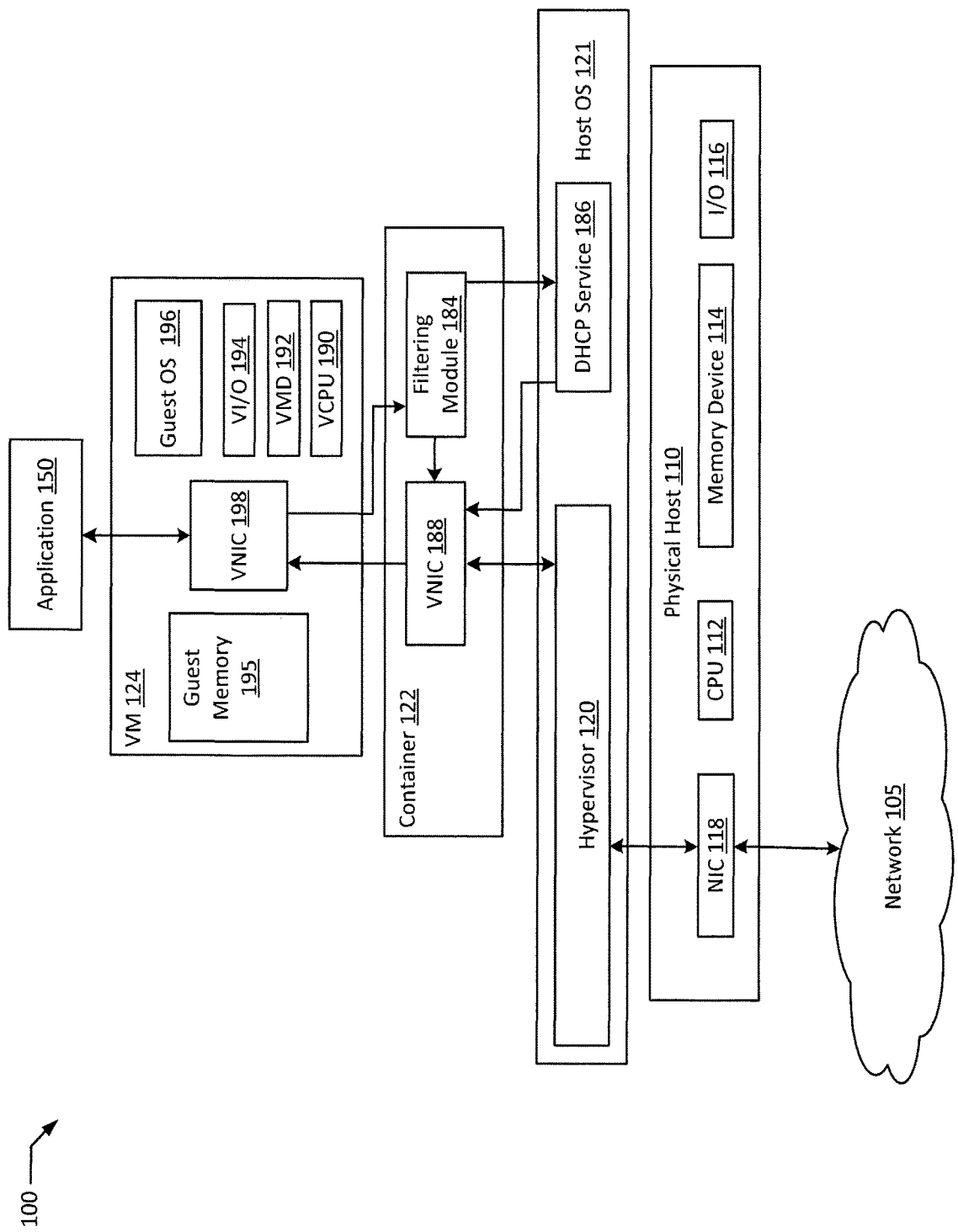
FIG. 1 is a block diagram of a filtering based virtualized networking system according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. In sharing physical computing resources, guests and/or a hypervisor controlling them, may also have access to shared components of the underlying host, for example, I/O devices (e.g., network interface cards ("NICs"), storage controllers, USB controllers, PS2 interfaces, etc.). However, such access is typically restricted through a virtualization manager such as a hypervisor to ensure that virtual environments remain segregated and to prevent unauthorized access to other virtual environments on the same host, or to the host itself. In some examples, a container based virtualization system, for example, one managed by a container manager such as Red Hat® OpenShift® executing a containerization runtime environment such as Docker® may be implemented. Typically, a container will be hosted on a physical host or virtual machine that already has an operating system executing, and the container may be hosted on the operating system of the physical host or VM without executing an independent operating system of its own. Containers may be advantageous by being typically faster to deploy than virtual machines with independent operating systems and by typically incurring less computing overhead to execute than full virtual machines.

However, since containers typically rely on their host's operating system for certain processing tasks, a container may provide a potential avenue for malicious attackers to gain elevated supervisor level access to the container's host (e.g., via the container's host operating system). Therefore, for certain sensitive processing tasks, a container may be deployed to host a virtual machine whose access to computing resources is managed by a hypervisor rather than the container's host operating system. In such implementations, the container (or the container's host) hosting the VM is typically configured as if it is a network gateway hosting a virtualized private network, and the VM would typically be assigned a private IP address by the container implementing network address translation (NAT). For example, a host implementing NAT and acting as a network gateway for a virtual intranet within the host may be assured that each guest executing on the host has a valid IP address for sending and receiving messages. These internal use only IP address may be reused by other hosts because the internal IP address is substituted or translated to a public or global IP address of the host on each incoming or outgoing message. For example, a host may have a public IP address (e.g., 100.0.0.0) and may be configured to assign internal addresses to its guests from a range of addresses reserved for private networks (e.g., 192.168.0.0-192.168.0.100). A first guest on the host could therefore be assigned an internal address of 192.168.0.0. In the example, on outbound messages, the host would substitute its address of 100.0.0.0 for the guest's internal address of 192.168.0.0 via NAT before sending out the message, and therefore the message sent would be labeled with the host's address of 100.0.0.0 as a return address. When a response is received by the host, it then determines based on metadata included with the message that the proper destination is the guest executing on the host, and the message is therefore translated to be targeted to the internal address of 192.168.0.0, resulting in the message being routed to the guest. NAT therefore allows for differentiated message routing between guests on the same host while only requiring one global or public IP address for the host.

In the containerized VM example, the VM's private IP address would be translated by the container on both inbound and outbound network traffic to and from the VM into an external IP address of the container (or the container's host) for external communications. For example, the assigned private IP address may be an address only recognized within the virtualized private network, and may be translated by the NAT process on outbound messages to an IP address of the VM's host (e.g., the container or container host). Inbound messages would be addressed to the VM's host, which would recognize that the inbound message packets are actually directed towards the VM, and then translate the VM host's address to the VM's private IP address to then direct the message packets to the VM. While NAT allows a host (e.g., container or container host) with one external network address to internally host numerous guests by providing those guests with secure, private, internal IP addresses, NAT typically adds significant latency to network transmissions by incurring lookup and translation overhead on each inbound and outbound message packet. For example, to implement NAT, each network packet whether inbound or outbound needs to undergo a NAT lookup to remap its associated IP address (e.g., return address on outbound messages and destination address on inbound messages), and each packet then needs to be modified to reflect the results of the NAT lookup. Typically, adding a layer of NAT translation will limit network transmission speeds to a maximum of roughly 50% of maximum hardware wire transmission speeds without NAT. However, NAT is typically implemented especially in IPv4 systems to allow IP addresses to be reused, so that internal network addresses do not need to be unique IP addresses. For example, the same IPv4 address (e.g., 192.168.0.1) may be assigned to a first VM on a first host, and then also assigned to a second VM on a second host.

The present disclosure provides for a secure networking solution for nested guests allowing for direct message routing without implementing any additional layer of virtualized private network or utilizing IP translation techniques such as NAT, thereby avoiding significant network performance degradation for nested guests (e.g., containers hosting VMs). In an example, a nested VM is assigned a public IP address, and network packets from the VM are checked for a valid VM IP address by its host container with a preconfigured filter. Instead of a NAT style lookup and address translation, a simple comparison is taken between the return address of the VM in a network packet and a preconfigured address for the VM in a filter module on the VM's host. If the packet includes the address configured in the filter module, the packet is validated and allowed to pass through the filter to the host's network interface for outbound transmission. Network packets that do not contain the VM's IP address are redirected to a remediation service, for example, a DHCP service that assigns an IP address to the VM. A failed filter match may be due to any combination of factors resulting in a mismatch between message packet and filter module, for example, a lack of or incorrect configuration of the VM and/or filter module. Inbound network packets towards the VM pass through the VM's host, and are routed to the VM based on the packets having the VM's IP address as a target address. For additional security (e.g., in systems where external communications need to be segregated from privileged access to a host operating system), a container hosting a secured VM may be implemented without its own IP address, and therefore may be inaccessible to external systems via networking protocols. In such examples, messages directed towards the VM's IP address may be received by the container and redirected straight into the VM by the container, without the contents of the message body being evaluated by the container itself, thereby maintaining the VM's higher level of compute resource access controls. Network packets are therefore either passed through without modification after a simple validation (without lookup) or they are rejected. Maximum network transmission speeds therefore approach maximum hardware transmission speeds (e.g., wire speed). By implementing filtering based containerized virtual machine networking, nested guests may gain significantly higher maximum network transmission speeds while incurring less host processor overhead on each network transmission (and therefore less time spent processing networking interrupts by these host processors), resulting in significantly reduced guest hosting overhead, especially for guests that transmit frequently over the network. Virtualized computing efficiency is therefore increased, reclaiming computing capacity on physical hardware for additional processing tasks. By deploying VMs inside of containers, computing tasks that require the higher access security offered by VMs may also be orchestrated for deployment with container orchestration utilities which may be configured for rapid deployment to meet new compute capacity demands. These containers hosting VMs may also be part of larger clusters of containers orchestrated for joint deployment for more complex computing tasks, where some of the computing processes do not require extra security and may be hosted directly on containers.

FIG. 1 is a block diagram of a filtering based virtualized networking system according to an example of the present disclosure. The system 100 may include one or more physical host(s) 110. Physical host 110 may in turn include one or more physical processor(s) (e.g., CPU 112) communicatively coupled to memory device(s) (e.g., MD 114) and input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. For example, a network interface card (e.g., NIC 118) may be an example of an I/O device through which physical host 110 and guests (e.g., container 122 and/or VM 124) hosted on physical host 110 communicates with external systems over a network 105. CPU(s) 112 may be interconnected using a variety of techniques, ranging from a point-to-point processor interconnect, to a system area network, such as an Ethernet-based network. Local connections within physical host 110, including the connections between processor 112 and a memory device 114 and between processor 112 and I/O device 116 may be provided by one or more local buses of suitable architecture, for example, peripheral component interconnect (PCI).

In an example, physical host 110 may host one or more guests (e.g., container 122 and/or VM 124). In an example guests may be VMs and/or containers, which may additionally host additional nested layers of guests (e.g., container 122 hosting VM 124). For example, application 150 may be another virtual guest nested inside of VM 124. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, container 122 may execute on physical host 110 (e.g., on host OS 121 of physical host 110). In an example, container 122 may execute on a virtual host (e.g., a VM) executing on physical host 110. In addition, containers and/or VMs may further host other guests necessary to execute their configured roles (e.g., a nested hypervisor or nested containers). In an example, a guest (e.g., container 122 and/or VM 124) further host additional guests such as a Java® Virtual Machine ("JVM"), for example, if execution of Java® code is necessary.

System 100 may run a software layer (e.g., hypervisor 120) above the hardware and below the guests (e.g., container 122 and/or VM 124), as schematically shown in FIG. 1. In an example, the hypervisor 120 may be a component of respective host operating system 121 executed on physical host 110. In another example, the hypervisor 120 may be provided by an application running on host operating system 121. In an example, hypervisor 120 may run directly on physical host 110 without an operating system beneath hypervisor 120. Hypervisor 120 may virtualize the physical layer, including processors, memory, and I/O devices, and present this virtualization to guests (e.g., VM 124) as devices, including virtual central processing unit ("VCPU") 190, virtual memory devices ("VIVID") 192, virtual input/output ("VI/O") device 194, and/or guest memory 195. In an example, a physical I/O device (e.g., I/O 116, NIC 118) may be virtualized to provide the functionality of the physical device to a virtual guest (e.g., VNICs 188 and/or 198). Processor virtualization may be implemented by the hypervisor 120 scheduling time slots on physical processors 112 such that from the guest operating system's perspective those time slots are scheduled on a virtual processor 190.

VM 124 may run on any type of dependent, independent, compatible, and/or incompatible applications on the underlying hardware and host operating system 121. In an example, application 150 running on VM 124 may be dependent on the underlying hardware and/or host operating system 121. In another example, application 150 running on VM 124 may be independent of the underlying hardware and/or host operating system 121. In an example, application 150 running on VM 124 may be compatible with the underlying hardware and/or host operating system 121. Additionally, application 150 running on VM 124 may be incompatible with the underlying hardware and/or OS. The hypervisor 120 may manage memory for the host operating system 121 as well as memory allocated to VM 124 and guest operating system 196 such as guest memory 195 provided to guest OS 196. In an example, Container 122 may execute on host OS 121, and may be dependent on host OS 121 for memory and/or processor management. In an example, code executing on container 122 may be required to be compatible with host OS 121. However, in such examples, the virtualization software for VM 124 may be compatible with container 122 and host OS 121, while the guest OS 196 and/or application 150 executing on VM 124 need not be compatible with host OS 121.

In an example, any form of suitable network (e.g., network 105) for enabling communications between computing devices, for example, a public network (e.g., the Internet), a private network (e.g., a local area network (LAN) or wide area network (WAN)), or a combination thereof may be employed to connect physical host 110, container 122, and/or VM 124 to other computer systems. In an example, NIC 118 provides an interface between physical host 110, container 122, and/or VM 124 and network 105.

In an example, container 122 is a rapidly instantiated light weight guest deployed to host OS 121 by a scheduler, which may be part of a container orchestrator (e.g., Red Hat® OpenShift®, Kubernetes®, etc.). In the example, application 150 is a programming task that container 122 is configured to execute. However, in the illustrated example system 100 of FIG. 1, application 150 is not hosted directly in container 122, but rather with an additional layer of virtualization in between (e.g., VM 124). For example, VM 124 may execute with a guest OS 196 that is incompatible with host OS 121, but guest OS 196 may be required by application 150. In another example, application 150 may be an external (e.g., internet) facing application, but host OS 121 may additionally host other guests with access to sensitive, high-security information. In such examples, because container 122 executes on host OS 121, and relies on its host's supervisor (e.g., the kernel of host OS 121) to perform certain computing tasks, allowing external users to directly access container 122 (e.g., if application 150 were directly hosted by container 122) may provide a potential avenue for malicious users to gain privileged supervisor access to host OS 121. In such examples, adding a layer of virtual machine virtualization (e.g., VM 124) whose processor (e.g., VCPU 190), memory (e.g., VMC 192, guest memory 195), and device (e.g., VI/O 194, VNIC 198) access is controlled by a hypervisor (e.g., hypervisor 120) rather than by the supervisor of host OS 121 prevents some potential exploits for gaining unauthorized access.

In a typical example of nested virtualization, a virtualization host (e.g., container 122 and/or physical host 110) may implement NAT to provide additional differentiated virtual IP addresses for routing messages to and from its guests (e.g., VM 124). For example, a network controller of physical host 110 and/or container 122 may assign only one global IP address to the host (e.g., physical host 110 and/or container 122), for example, a unique IP address that is published publically, that allows traffic to be routed over a public network (e.g., the internet) or a private intranet. In an example, due to the limited number of available IPv4 addresses, a given entity (e.g., company, organization, programmer, etc.) may have access to a limited number of reserved global IP addresses. Therefore, to conserve these addresses, nested guests may be assigned a private IP address from a range of addresses that is conventionally reserved for internal networks. For example, a host may sequentially or randomly assign internal IP addresses to its guests from a reserved range of IP addresses that is not typically used for global or public IP addresses (e.g., 192.168.0.0-192.168.255.255). This allows multiple guests to be able to communicate with the external world while only occupying one global IP address (e.g., assigned to the host of the guests), with the host handling the redistribution of messages to each of its guests (e.g., via NAT). Internal IP assignment and NAT may be implemented by default on typical hosts of virtual guests to ensure that a valid routing path exists to each guest on the host. However, implementing NAT adds significant latency to network transmissions.

In example system 100, application 150 is an application that requires external network access (e.g., access to network 105), and therefore VM 124 may benefit from being assigned a global IP address to allow messages to be routed in from network 105 directly. In an example, this global address may be a global address accessible from the internet. In another example, rather than a true global address, VM 124's IP address may be a private address of a larger intranet separated from the internet via a network gateway. In either case, VM 124's assigned IP address is one that allows messages to be routed to VM 124 through physical host 110 and container 122 without translation by physical host 110 or container 122 (e.g., via NAT). In an example, container 122 is implemented with a filtering module 184, which may be a program configured to check network packets from VM 124 (e.g., sent via VNIC 198) for VM 124's IP address as a return address for responses. In the example, filtering module 184 is configured with VM 124's IP address and performs a match between the configured IP address in filtering module 184 and the return address in message packets from VM 124. In an example, message packets properly labeled with VM 124's IP address are passed through VNIC 188 to NIC 118 for outbound transmission. In an example, VNIC 198's messages outbound messages to VNIC 188, and/or VNIC 188's outbound messages to NIC 118 may be handled by hypervisor 120, for example, by making a memory address in memory device 114 storing the message available to the next network interface along the chain of network interfaces and network devices between the source and destination of the message. In an example, inbound messages to VM 124's IP address are received by NIC 118, forwarded to VNIC 188, and then forwarded again to VNIC 198 based on VM 124's IP address. In an example, an inbound message received by NIC 118 may be stored to memory device 114, and the memory location of the message may be made accessible to VNIC 188 by hypervisor 120, which may then request the message to be made available to VNIC 198, which may then retrieve the message from the memory location to be parsed within VM 124.

In an example, if a given message packet from VNIC 198 does not include a return address matched by filtering module 184, the message is rejected and sent to a remediation service. For example, VM 124 may be newly instantiated and may not yet have a configured IP address. In such examples, VM 124 may send messages with a default, placeholder address that is not configured in filtering module 184. In another example, filtering module 184 may not yet be configured with an IP address to validate VM 124's IP address. In any scenario a mismatch, whether due to an incorrect, incomplete, invalid, or missing configuration of VM 124 and/or filtering module 184, results in a remediation service being requested. In an example, a Dynamic Host Configuration Protocol ("DHCP") Service may be configured to act as the remediation service. For example, a DHCP service may be configured with a range of valid public or global IP addresses available to be assigned to the entity operating physical host 110, container 122, and/or VM 124. In the example, the DHCP service, upon receiving notice that VM 124 is not configured with a valid IP address (e.g., based on a mismatch in filtering module 184), may assign an IP address to VM 124 from the range of available IP addresses. This newly assigned IP address may also be assigned to filtering module 184, so that future messages from VM 124 with the newly assigned IP address will match the updated configuration in filtering module 184. In an example, DHCP service 186 may be hosted on physical host 110 (e.g., directly in hardware, on host OS 121, in container 122, etc.). In an example, DHCP service 186 is in communication with other DHCP services via network 105, allowing DHCP service 186 to have an updated list of available IP addresses, as well as to allow DHCP service 186 to update other DHCP services that the newly assigned IP address to VM 124 is no longer available.

In an example, the overhead incurred to have DHCP service 186 assign a new IP address to VM 124 is a one time overhead cost that, under normal operating conditions, will only need to be performed rarely. For example, a public IP address may typically remain valid for periods of 24-72 hours or more, and therefore after an initial failed message from VM 124 triggering DHCP service 186 to remediate, VM 124 and/or filtering module 184 will likely remain configured without needing to access DHCP service 186 again for the life of VM 124 and container 122. This is because most containerized applications (e.g., application 150) are relatively short-lived deployments. In an example, DHCP service 186 and/or filtering module 184 may additionally be configured to translate the rejected message from VM 124 to include the newly assigned valid IP address for VM 124, allowing the message to proceed to transmission after a delay for IP address assignment. Therefore, rather than incurring a lookup and translation cost on every message packet both inbound and outbound, lookup (e.g., of available valid public IP addresses) and translation (e.g., from a defective IP address sent by VM 124) is only performed once every few days, resulting in significantly faster outbound networking speeds. In addition, on inbound messages, lookup and translation is avoided completely, since external systems would only be able to send messages to VM 124 after VM 124 has a properly assigned public IP address. In various examples, DHCP Service 186, filtering module 184, and/or application 150 may be implemented as any form of executable code (e.g., application, program, service, script, executable file, etc.) written in any suitable programming language. In some examples, the remediation service may be as simple as an alerting system that raises an alert to an administrator (e.g., via email, error log, error prompt, etc.) to fix the network configuration issue. This type of simple remediation system may additionally be integrated with automated remediation, for example, by invoking a DHCP Service to handle the exception caused by the rejected message after a timeout for administrator response is triggered. In an example, automated remediation may result in an alert being sent to an administrator to review whether the automated remediation action should be overridden and/or modified (e.g., if a guest requires a static IP address rather than a dynamically assigned address).

Figure 2:
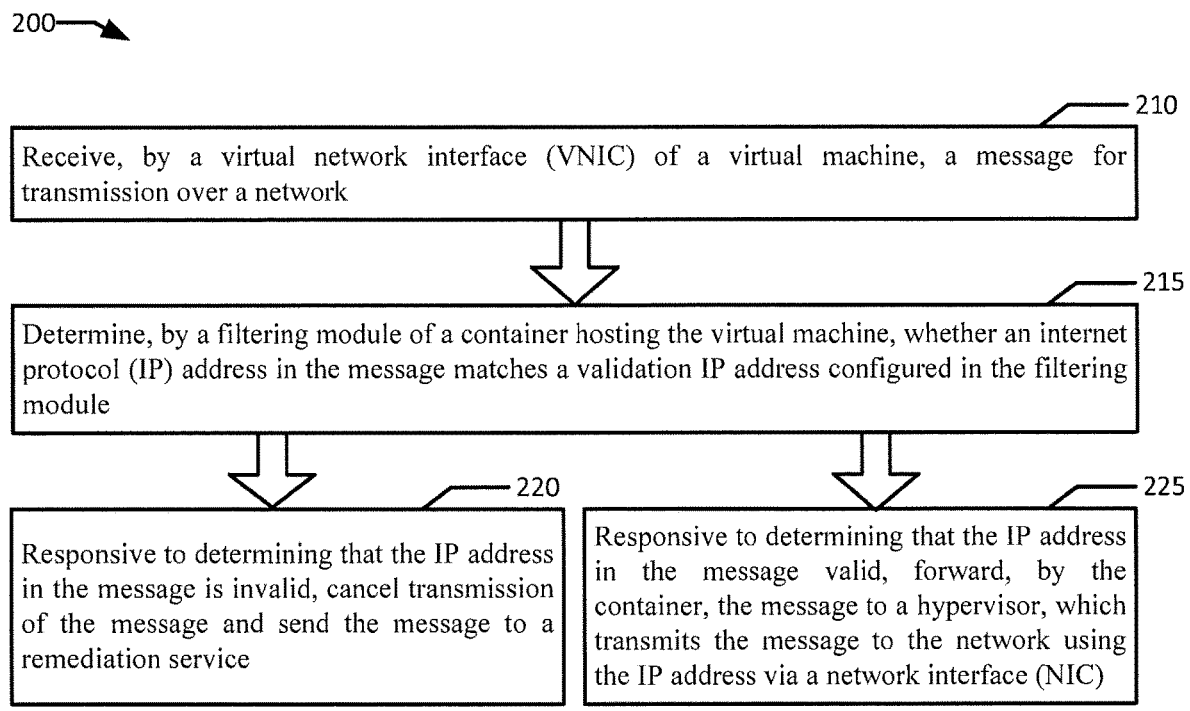
FIG. 2 is a flowchart illustrating an example of filtering based containerized virtual machine networking according to an example of the present disclosure.

FIG. 2 is a flowchart illustrating an example of filtering based containerized virtual machine networking according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example, the method 200 is performed by a container 122 and a hypervisor 120.

Example method 200 may begin with receiving, by a virtual network interface (VNIC) of a virtual machine, a message for transmission over a network (block 210). In an example, application 150 on VM 124 sends a message for transmission over network 105 via VNIC 198. In the example, the message is divided into numerous packets. The message also includes a header with IP address information of the sender (e.g., VM 124) and the recipient of the message. In an example, VM 124 is virtualized such that from application 150's and/or guest OS 196's perspective, application 150 and/or guest OS 196 may be unaware that they are executing on a virtualized system. In an example, application 150 may be unable to distinguish that VNIC 198 is not an actual network interface that transmits messages to network 105. In an example, a message sent to VNIC 198 is stored in guest memory 195, and hypervisor 120 is configured to pass the message onto VM 124's host (e.g., container 122) for transmission.

A filtering module of a container hosting the virtual machine determines whether an internet protocol (IP) address in the message matches a validation IP address configured in the filtering module (block 215). In an example, filtering module 184 of container 122 receives the message (e.g., the message packets) and parses the message (e.g., the message header) for a return IP address of VM 124. In the example, the IP address of VM 124 is configured in filtering module 184. In an example, container 122 is a lightweight virtual guest (e.g., implemented with Docker®) without its own full operating system, where the supervisor of container 122's host (e.g., host OS 121) has direct access to container 122 and full control over container 122's processes. In contrast, VM 124 may be implemented with an independent guest operating system 196, and may access computing resources of physical host 110 (e.g., CPU 112, memory device 114, I/O 116, NIC 118) via hypervisor 120 providing virtual interfaces for these physical components (e.g., VCPU 190, VIVID 192, VI/O 194, guest memory 195, VNIC 198). In the example, hypervisor 120 manages VM 124's access to compute resources, including permissioning and security controls for such access.

In response to determining that the IP address in the message is invalid, transmission of the message is canceled and the message is sent to a remediation service (block 220). In an example, a failure to match a configured IP address in filtering module 184 with an IP address in the message from application 150 results in an invalid message, which is cancelled and sent to a remediation service (e.g., an alert service, DHCP service 186, etc.). In an example, filtering module 184 is implemented between VNIC 198 and VNIC 188 to validate that a message from VM 124 may be properly responded to (e.g., verifying a return address to VM 124) prior to the message being sent to VNIC 188 for further transmission. In an example, an automated remediation service may be configured, for example, a DHCP service 186 to handle a network configuration error for VNIC 198 associated with the rejected network message. In the example, the DHCP service may be configured to interpret the rejected message from application 150 as a DHCP configuration request (e.g., DHCPDISCOVER) from VM 124. In an example, filtering module 184 may send the DHCP configuration request on behalf of VM 124. The DHCP service 186, upon receiving the configuration request, selects an IP address from its configured range of available IP addresses to assign to VM 124. In an example, after an available IP address is selected, it is reserved for the Media Access Control ("MAC") address of VNIC 198, and a reservation message (e.g., DHCPOFFER) is sent to VM 124 and/or filtering module 184 with the newly assigned IP address. The reserved IP address may then be accepted via an handshake between VNIC 198 and/or filtering module 184 with DHCP service 186 (e.g., DHCPREQUEST and DHCPACK). Typically a remaining duration of VNIC 198's lease on the newly assigned IP address would also be included. In an example, the assigned IP address to VNIC 198 and VM 124 may be a global IP address accessible from external systems via network 105.

In an example, after the IP address is assigned to VNIC 198, the previously rejected message from application 150 may be translated into a valid message. For example, filtering module 184 may buffer the rejected message until it is reconfigured with the newly assigned IP address of VNIC 198, and then amend the message to include the newly assigned IP address. This amended message may be sent to VNIC 188 or hypervisor 120 for further transmission. In other examples, other components (e.g., DHCP service 186) may generate the amended message, or application 150 may resend the message with the updated IP address information in the newly resent message's message header. In an example, subsequent messages from VM 124 and application 150 include the properly configured IP address of VM 124 and are routed through VNICs 198 and 188 to NIC 118 for transmission.

In an example, the remediation service may be configured to generate an error that is brought to the attention of an administrator, either in place of or in addition to triggering an automated remediation service (e.g., DHCP service 186). The error may indicate, for example, that VM 124 lacks an assigned IP address, that VM 124 is assigned an incorrect IP address, that the message from application 150 includes an incorrect IP address (e.g., an address that is not assigned to VM 124), and/or that the message fails to include an IP address.

In response to determining that the IP address in the message valid, the container forwards the message to a hypervisor, which transmits the message to the network using the IP address via a network interface (NIC) (block 225). In an example, if filtering module 184 matches an IP address in application 150's message's message header to a configured IP address in filtering module 184, the message is verified as valid and forwarded to VNIC 188 for further transmission. In an example, filtering module 184 may evaluate the header of the message without evaluating the contents of the message body. In an example, VNIC 188 forwards the message without further validation to NIC 118 for transmission over network 105, resulting in potentially faster message handling by VNIC 188 and therefore lower network latency. In some examples, hypervisor 120 provides an interface between VNIC 188 and NIC 118.

In an example, VNIC 188 may be implemented as a limited functionality network interface. For example, VNIC 188 may be implemented without independent message transmission functionality. In addition, VNIC 188 may be implemented without its own MAC address and/or IP address. In an example, VNIC 188 may additionally be configured to not read or parse the contents of message bodies. For example, VNIC 188 may be implemented as an interface or conduit between NIC 118 or hypervisor 120 and VNIC 198. For example, hypervisor 120 and/or NIC 118 may require messages for outbound transmissions from virtual guests to originate from a virtual device that declares itself as a virtual network interface. In such an implementation, VNIC 188 may register itself as a virtual network interface without performing many of the tasks typically associated with a virtual network interface. In an example, a more limited functionality VNIC 188 provides greater security. For example, if VNIC 188 is configured to only pass through messages or reject them without evaluating their contents, malicious instructions in those message contents may be advantageously prevented from being executed. Without its own IP address, container 122 may pass all messages received based on being labeled with VM 124's IP address into VM 124, thus limiting potential attempts to gain elevated access to host OS 121. In an example, VNIC 188 may be configured to respond that its IP address is the IP address of VM 124 and VNIC 198. In such an example, queries for VNIC 188's IP address result in VNIC 198's IP address, and messages sent to the IP address are routed into VM 124. In some examples, container 122 may host multiple additional guests. In such examples, each additional guest's IP address would be additionally configured in filtering module 184 to validate outbound messages from those additional guests.

Figure 3:
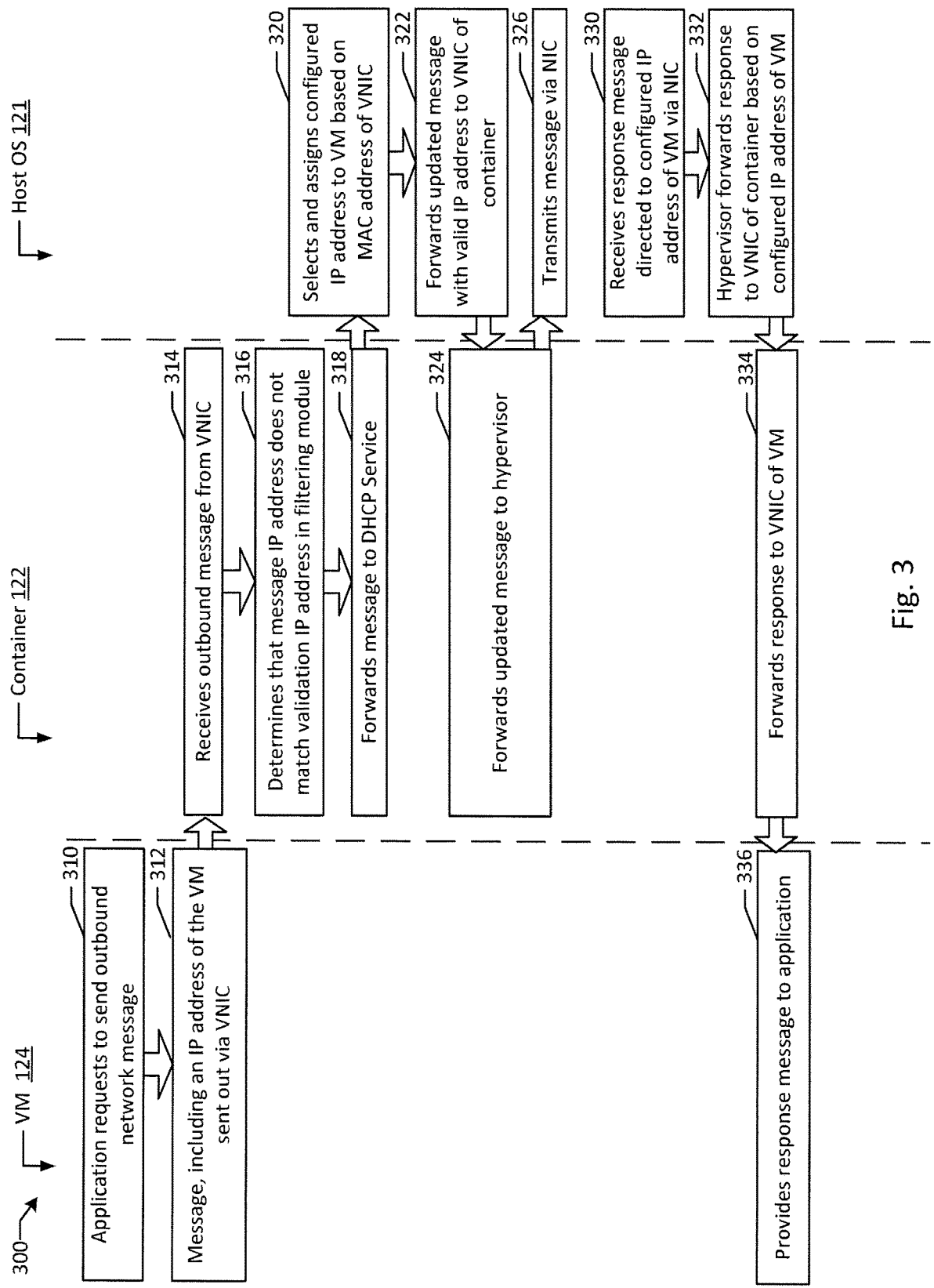
FIG. 3 is flow diagram of an example of filtering based containerized virtual machine networking according to an example of the present disclosure.

FIG. 3 is flow diagram of an example of filtering based containerized virtual machine networking according to an example of the present disclosure. Although the examples below are described with reference to the flowchart illustrated in FIG. 3, it will be appreciated that many other methods of performing the acts associated with FIG. 3 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 300, VM 124 transmits a message routed through container 122 and host OS 121.

In example system 300, VM 124 hosts application 150, which requests an outbound network message to be sent over network 105 (block 310). In the example, the message includes an IP address of VM 124 (e.g., in the message's header), is sent out via VNIC 198. In an example, VM 124's host (e.g., container 122) receives the outbound message from VNIC 198 (block 314). For example, hypervisor 120 may map the memory location storing the message to an inbound message queue for container 122. In an example, container 122 parses the message header and determines that the IP address included in the message does not match a validation IP address stored in filtering module 184 (block 316). For example, VM 124 may have been recently launched and may only be configured with a default address without having been assigned a currently valid and registered IP address via either DHCP or administrator action. In another example, VM 124 may have been suspended and VNIC 198 reassigned to a new MAC address upon resumption, resulting in VNIC 198's previously configured IP address now being invalid. In an example, the defective message is rejected and forwarded to DHCP service 186 for remediation (block 318). In another example, a DHCP service 186 receives a DHCP IP assignment request from filtering module 184 or from VNIC 198 after VNIC 198 receives notice its message was rejected.

In an example, DHCP service 186 executes on host OS 121 and selects and assigns a new configured IP address to VM 124 (e.g., VNIC 198) based on the MAC address of VNIC 198 (block 320). In an example this assignment process requires a handshake process with VNIC 198 and/or filtering module 184. In an example, DHCP service 186 is configured to interpret a forwarded rejected message as a request for IP configuration. In an example DHCP service 186 may update the forwarded rejected message from application 150 with the newly configured valid IP address of VNIC 198, and send the updated, amended message to VNIC 188 of container 122 (block 322). In an example, VNIC 188 may be configured to forward every outbound message received to hypervisor 120 and/or NIC 118 for transmission (block 324). For example, VNIC 188 may be configured to trust that filtering module 184 has performed the necessary validation for outbound messages prior to transmission. In an example, host OS 121 transmits the updated message via NIC 118 (block 326).

In an example, NIC 118 receives a response message directed to the updated, configured IP address of VNIC 198 (block 330). In the example, hypervisor 120 forwards the response message to VNIC 188 of container 122 based on the configured IP address of VNIC 198 (block 332). In an example, VNIC 188 forwards the response message to VNIC 198 of VM 124 (block 334). In an example, VNIC 188 may lack its own IP address and may be addressable by VNIC 198's IP address. In such examples, messages received by VNIC 188 may be directly forwarded to VNIC 198. In an example, VM 124 and VNIC 198 parse the contents of the response message and reassemble the response message from the various packets the response message is divided into before providing the response message to application 150 (block 336).

Figure 4:
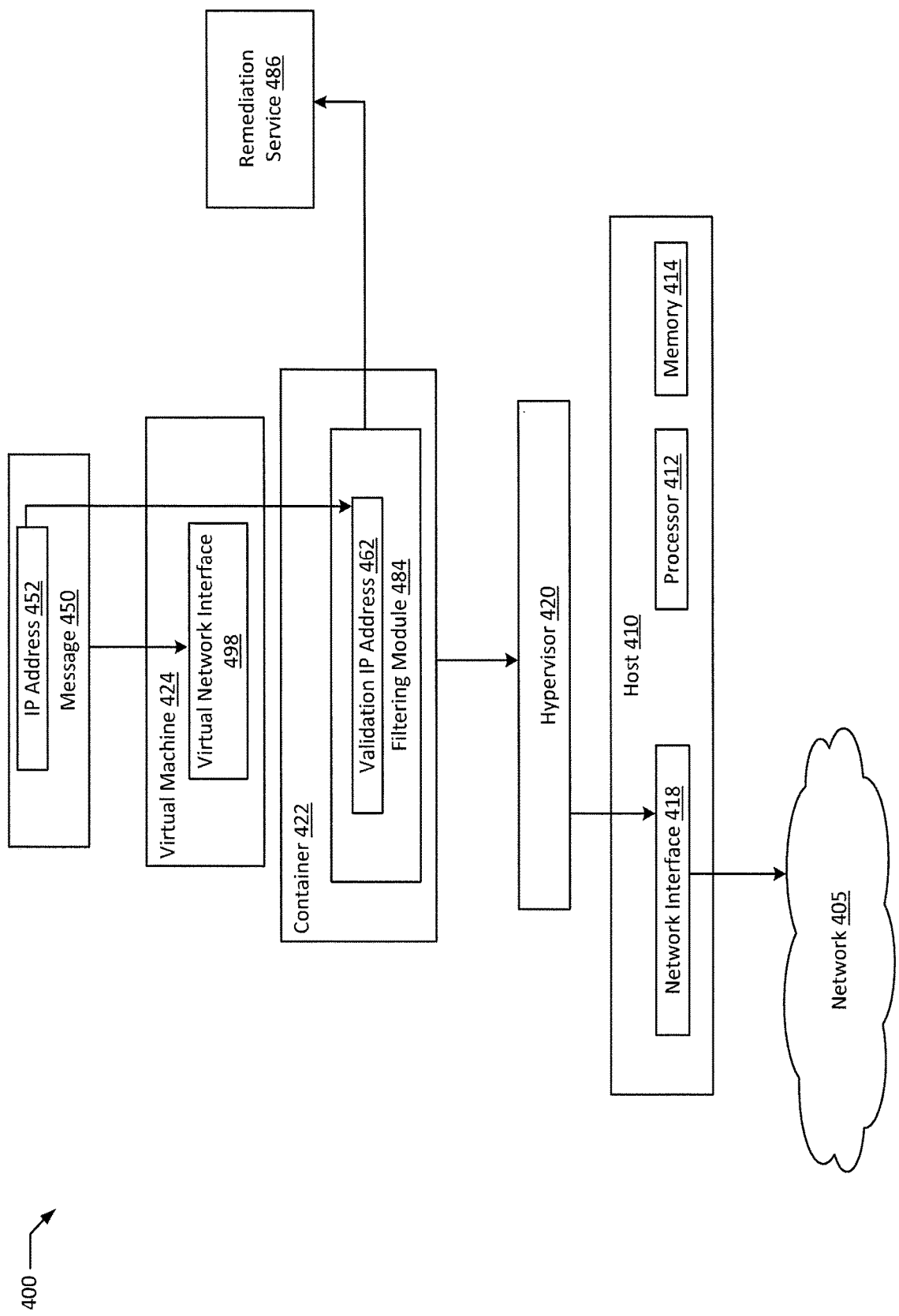
FIG. 4 is a block diagram of an example system implementing filtering based virtualized networking according to an example of the present disclosure.

FIG. 4 is a block diagram of an example system implementing filtering based virtualized networking according to an example of the present disclosure. Example system 400 includes host 410 with processor 412, memory 414, and network interface 418, with hypervisor 420 and container 422 including filtering module 484 executing on host 410, and with virtual machine 424 including virtual network interface 498 executing on container 422. Virtual network interface 498 receives message 450 for transmission over network 405. Filtering module 484 determines whether IP address 452 in message 450 matches validation IP address 462 configured in filtering module 484. In response to determining that IP address 452 is invalid (e.g., fails to match validation IP address 462), transmission of message 450 is canceled and message 450 is sent to remediation service 486. In response to determining that IP address 452 is valid (e.g., matches validation IP address 462), message 450 is forwarded by container 422 to hypervisor 420, which transmits message 450 to network 405 using IP address 452 via network interface 418.

Filtering based containerized virtual machine networking allows for an alternative to providing IP addresses to guests for network message routing without incurring the latency and/or computational costs of adding an additional virtualized private IP networking layer (e.g., via NAT). Maximum network transmission speeds are therefore greatly increased in the presently disclosed system because a layer of packet by packet inspection and translation is removed from each network transmission. In addition, by implementing a filtering module with a matching mechanism, a container hosting a VM may become a conduit for network messages, without needing to be an independently accessible via network, thereby ensuring that the contents of network messages are only evaluated inside of a secure VM without exposing the container itself, and therefore the container's host's supervisor to these network transmissions. Therefore, filtering based containerized virtual machine networking provides for a faster and more secure networking solution, especially in situations where a container needs to host a secure application that requires unsecure network connectivity.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a host with a processor, a memory, and a network interface (NIC), with a hypervisor executing on the host;
a container with a filtering module executing on the host; and
a virtual machine (VM) with a first virtual network interface (VNIC) executing on the container,
wherein the VM is configurable with a public internet protocol (IP) address, the filtering module is configured to check whether the public IP address of the VM executing on the container is included in messages, and the processor is configured to execute to:
receive, by the first VNIC, a first message for transmission over a network;
determine, by the filtering module, whether an IP address in the first message matches a validation IP address configured in the filtering module, wherein the validation IP address is the public IP address of the VM executing on the container;
responsive to determining that the IP address in the first message is invalid, cancel transmission of the first message and send the first message to a remediation service, wherein the remediation service is a Dynamic Host Configuration Protocol (DHCP) service; and
responsive to determining that the IP address in the first message is valid, forward, by the container, the first message to the hypervisor, which transmits the first message to the network using the IP address via the NIC.

2. The system of claim 1, wherein the remediation service generates an error indicating that at least one of (i) the VM lacks an assigned IP address, (ii) the VM is assigned to an incorrect IP address, (iii) the first message includes an incorrect IP address, and (iv) the first message fails to include any IP address.

3. The system of claim 1, wherein the container further includes a second VNIC.

4. The system of claim 3, wherein the DHCP service executes to:

interpret the first message as a DHCP request from the VM;
select an IP address based on a media access control (MAC) address of the VM as a configured IP address of the VM; and
assign the configured IP address to the VM.

5. The system of claim 4, wherein the configured IP address is added to the first message generating an amended message, and the amended message is forwarded to one of the second VNIC and the hypervisor.

6. The system of claim 4, wherein the DHCP service sends the configured IP address to at least one of the VM and the filtering module, causing the VM to be configured with the configured IP address and the validation IP address in the filtering module to be updated with the configured IP address, and wherein a second message received by the filtering module from the first VNIC includes the updated configured IP address.

7. The system of claim 3, wherein a second message received by the NIC from the network is redirected to the second VNIC based on the second message including the IP address of the VM, and the second VNIC passes the second message through to the first VNIC enabling the VM to interpret the second message.

8. The system of claim 3, wherein the container and the second VNIC are only associated with the IP address of the VM, resulting in all network communications directed towards the container being redirected into the VM.

9. The system of claim 3, wherein a query to the second VNIC for an IP address of one of the second VNIC and the container results in a response including the IP address of the VM.

10. The system of claim 1, wherein a supervisor of the host has direct access to the container and has control over the container.

11. The system of claim 1, wherein the IP address of the VM is a global IP address.

12. The system of claim 1, wherein the VM has restricted access to computing resources of the host, which access is restricted by the hypervisor.

13. The system of claim 1, wherein the first message is divided into packets and each packet of the first message includes the IP address of the VM.

14. A method comprising:
receiving, by a first virtual network interface (VNIC) of a virtual machine (VM), a first message for transmission over a network, wherein the VM is configurable with a public internet protocol (IP) address;
determining, by a filtering module, whether an IP address in the first message matches a validation IP address configured in the filtering module, wherein a container with the filtering module executes on a host, the filtering module is configured to check whether the public IP address of the VM executing on the container is included in messages, and the validation IP address is the public IP address of the VM executing on the container;
responsive to determining that the IP address in the first message is invalid, canceling transmission of the first message and sending the first message to a remediation service, wherein the remediation service is a Dynamic Host Configuration Protocol (DHCP) service executing on the host; and
responsive to determining that the IP address in the first message is valid, forwarding, by the container, the first message to a hypervisor, which transmits the first message to the network using the IP address via a network interface (NIC).

15. The method of claim 14, wherein the container further includes a second VNIC, the method further comprising:
interpreting the first message as a DHCP request from the VM;
selecting an IP address based on a media access control (MAC) address of the VM as a configured IP address of the VM; and
assigning the configured IP address to the VM.

16. The method of claim 15, further comprising:
attaching the configured IP address to the first message generating an amended message; and
forwarding the amended message to one of the second VNIC and the hypervisor.

17. The method of claim 15, further comprising:
sending the configured IP address to at least one of the VM and the filtering module, causing the VM to be configured with the configured IP address and the validation IP address in the filtering module to be updated with the configured IP address, and
receiving a second message by the filtering module from the first VNIC, wherein the second message includes the updated configured IP address.

18. The method of claim 15, wherein the container and second VNIC are only associated with the IP address of the VM, resulting in all network communications directed towards the container being redirected into the VM, and wherein a query to the second VNIC for an IP address of one of the second VNIC and the container results in a response including the IP address of the VM.

19. The method of claim 14, wherein a supervisor of the host has direct access to the container and has control over the container, and wherein the VM has restricted access to computing resources of the host of the container and the VM, which access is restricted by the hypervisor.

20. A computer-readable non-transitory storage medium storing executable instructions, which when executed by a computer system, cause the computer system to:
receive, by a first virtual network interface (VNIC) of a virtual machine (VM), a message for transmission over a network, wherein the VM is configurable with a public internet protocol (IP) address;
determine, by a filtering module, whether an IP address in the message matches a validation IP address configured in the filtering module, wherein a container with the filtering module executes on a host, the filtering module is configured to check whether the public IP address of the VM executing on the container is included in messages, and the validation IP address is the public IP address of the VM executing on the container;
responsive to determining that the IP address in the message is invalid, cancel transmission of the message and send the message to a remediation service, wherein the remediation service is a Dynamic Host Configuration Protocol (DHCP) service executing on the host; and
responsive to determining that the IP address in the message is valid, forward, by the container, the message to a hypervisor, which transmits the message to the network using the IP address via a network interface (NIC).

* * * * *